Patented Feb. 20, 1945

2,369,919

UNITED STATES PATENT OFFICE 2,369,919

KETOETHENONES AND PROCESS THEREFOR

John Carl Sauer, Wilmington, Del., assignor to E. I. du Pont de Nemours & Company, Wilmington, Del., a corporation of Delaware No Drawing. Application October 13, 1938, Serial No. 234,843

2 Claims. (Cl. 260—550)

This invention relates to organic compounds and more particularly to certain disubstituted ethenones, i. e., ketoethenones.

Numerous investigations into the dehydrohalogenation of primary acid halides, i. e., those in which the acid halide group

(X being a halogen) is attached to a methylene group, have been made, but there is no record of the preparation of low melting dehydrohalogenation products of monosubstituted ethanoyl halides.

This invention has as an object the preparation of low melting intermolecular dehydrohalogenation products of primary acid halides. A further object is the provision of a process therefor. Another object is the preparation of intermediates for dyes and other useful organic chemicals. Other objects will appear hereinafter.

These objects are accomplished by the following invention which comprises reacting a tertiary aliphatic amine free from active hydrogen under anhydrous conditions with a primary monoacyl halide R—CH$_2$—CO—X, where X is a halogen and R is a monovalent organic radical which, at temperatures up to 170° C., is chemically inert to tertiary amines, acyl halides, and ethenones, and isolating, also under anhydrous conditions, the resulting intermolecular dehydrohalogenation product, i. e., the disubstituted ethenone. The nature of the suitable amines and acid halides is more precisely explained hereinafter.

The reaction is carried out in the case of the higher acid halides, i. e. of at least eight carbon atoms (octanoyl and higher halides) by dissolving the acyl halide in an inert solvent and adding a chemically equivalent amount of the tertiary aliphatic amine with exclusion of moisture, i. e., under anhydrous conditions. The acyl halide may also be added to the amine in an inert solvent. The reaction mixture is agitated and if necessary cooled to abstract the heat of reaction. At 0°–25° C., the time required for complete reaction varies from 1–16 hours, depending on the acyl halide and amine used. Dehydrohalogenation is usually complete in an hour at room temperature when trimethylamine is employed or in 30 minutes when the reaction is carried out in refluxing benzene or xylene with a trialkylamine such as triethylamine. Higher temperatures promote a more rapid reaction. A test which may be applied to determine the end point is to withdraw a sample of the reaction mixture, filter it, add a small amount of amine to the filtrate, and boil. If no precipitate forms, the reaction is substantially complete. The higher substituted ethenones are conveniently purified by recrystallization, and distillation is usually unnecessary.

The lower acyl halides such as propanoyl chloride are very reactive towards tertiary aliphatic amines and are best dehydrohalogenated under reflux by adding the amine to the acyl halide solution (or vice versa) just fast enough to keep the solvent gently refluxing when low boiling solvents such as diethyl ether are employed. With high boiling solvents such as dichlorobenzene, any suitable and convenient rate of addition of the one reactant to the other may be employed. The lower acyl halides as a rule are completely dehydrohalogenated with trimethylamine within a few minutes at room temperatures.

The more detailed practice of the invention is illustrated by the following examples, wherein parts given are by weight unless otherwise stated. There are of course many forms of the invention other than these specific embodiments.

EXAMPLE I

Dodecanoyldecylethenone

To n-dodecanoyl chloride (43.6 parts) in anhydrous ether (350 parts) is added triethylamine (20.6 parts). These materials are thoroughly mixed out of contact with air, then left at room temperature for 3 days. Filtration yields triethylamine hydrochloride (28 parts or the theoretical amount) melting at 251–4° C. When the solvent is evaporated from the filtrate in vacuo and the residue crystallized from acetone, dodecanoyldecylethenone, a compound of the above probable formula and melting at 41–42° C. is obtained in 90% yield. This compound was found on analysis to contain 78.78% carbon and 12.19% hydrogen, and to have a molecular weight of 351. The calculated values are 79.10%, 12.09%, and 364, respectively.

The following table lists the proportions of reactants used and the yields of dodecanoyldecylethenone obtained from dodecanoyl chloride in similar experiments.

| Parts n-dodecanoyl chloride | Amine | | Solvent | | Reaction | | Per cent yield |
|---|---|---|---|---|---|---|---|
| | Nature | Parts | Nature | Parts | Time | Temp. | |
| | | | | | Hours | °C. | |
| 20 | (CH₃)₃N | 6 | Ethyl ether | 160 | ½ | 25 | 78 |
| 20 | do | 6 | Benzene | 160 | ½ | 25 | 78 |
| 20 | do | 6 | Ethyl ether | 160 | 16 | 25 | 78 |
| 14.5 | (C₂H₅)₃N | 6.9 | Benzene | 100 | 1 | 78 | 92 |
| 16.5 | do | 8 | Xylene | 110 | 1 | 135 | 100 |

EXAMPLE II

*Octadecanoylhexadecylethenone and its derivatives $C_{17}H_{35}COC(C_{16}H_{33})=C=O$*

To n-octadecanoyl chloride (15 parts) in anhydrous benzene (180 parts) is added triethylamine (6 parts). Dehydrohalogenation commences almost immediately, and the reaction mixture is permitted to stand at room temperature for 16 hours. After filtering out 6.9 parts of triethylamine hydrochloride (the theoretical yield), the filtrate is concentrated on a steambath in vacuo, and the residue is taken up in petroleum ether (32 parts). Upon cooling, 12 parts or a 97% yield of octadecanoylhexadecylethenone, a compound of the above probable formula and melting at 62–3° C., is obtained. It was found to have a molecular weight of 494 and carbon and hydrogen contents of 80.4% and 12.3%. The calculated values are 532, 81.1% and 12.7%, respectively. In the preparation of many chemical derivatives, e. g., from amines and hydroxylated compounds, it is not necessary to isolate the substituted ethenone from the solvent. Thus, to a portion of the filtrate containing the octadecanoylhexadecylethenone is added a chemically equivalent amount of aniline. The compound alpha-octadecanoylstearanilide precipitates from the solution and melts at 77–8° C. after recrystallization from alcohol. It has a nitrogen content of 2.6%, which checks the theoretical within experimental error.

In Example II above, octadecanoyl bromide may be substituted for octadecanoyl chloride, and the same compound obtained in yields of around 80%. Ether or benzene may be used as the solvent.

EXAMPLE III

*Octanoylhexylethenone $C_7H_{15}COC(C_6H_{13})=C=O$*

To n-octanoyl chloride (53 parts) in 355 parts of anhydrous ether is added triethylamine (34 parts). The reaction mixture is agitated out of contact with air and cooled in ice for 20 minutes to offset the heat of reaction. The mixture is set aside for 2 days at room temperature, and the triethylamine hydrochloride then filtered off, 96% of the theoretical amount being obtained. The solvent is evaporated from the filtrate. The residue (15 parts, or 75% yield) is octanoylhexylethenone, a compound of the above probable formula. It boils at 135–7° C./2 mm., has an index of refraction ($N_D^{25}$) of 1.4489, a molecular weight of 254, and carbon and hydrogen contents of 76.29% and 11.24%. The calculated molecular weight and carbon and hydrogen contents are 252, 76.2%, and 11.1%, respectively.

EXAMPLE IV

*3-methylbutanoylisopropylethenone $CH_3-CH(CH_3)CH_2COC(CH(CH_3)_2)=C=O$*

To 3-methylbutanoyl chloride (216 parts) in anhydrous ether (715 parts) is added gaseous anhydrous trimethylamine with stirring until all evidence of reaction ceases. The resulting mixture is allowed to stand at room temperature for 16 hours, the trimethylamine hydrochloride filtered off, and the solvent evaporated from the filtrate. The residue, amounting to 28 parts or a 60% yield, is 3-methylbutanoylisopropylethenone of the above probable formula. It boils at 108–110° C./35 mm., has an index of refraction, $N_D^{25}$, of 1.4343, and a molecular weight of 163 (calculated value 168). This substituted ethenone may readily be converted into alpha-isovalerylisovaleranilide (M. P. 105–6° C.) by reaction with aniline and into ethyl alpha-isovalerylisovalerate (B. P. 135° C./32 mm.) by reaction with ethyl alcohol. The former compound had a nitrogen content of 5.7%, and the latter a saponification number of 265, values which check closely with the theoretical. The identity of these derivatives further characterizes the substituted ethenone.

EXAMPLE V

*Propanoylmethylethenone $CH_3CH_2COC(CH_3)=C=O$*

Triethylamine (200 parts) is added slowly and with agitation over a period of 2 to 3 hours to a mixture of anhydrous ether (980 parts) and propanoyl chloride (179 parts) contained in a reaction vessel fitted with a reflux condenser, a stirrer, and a means for slowly adding the amine. After the mixture has stood at room temperature for 20 hours, filtration by the "inverted method" described in Organic Syntheses, vol. XVI, p. 82, is employed, and the theoretical amount of triethylamine hydrochloride is separated. On evaporating the solvent from the filtrate, there is obtained 75 parts or a 74% yield of alpha-propanoylmethylethenone, a compound of the above probable formula, B. P. 57–8° C./12 mm. and $N_D^{25}$ 1.4280. It was found to have a molecular weight of 114, and carbon and hydrogen contents of 63.88% and 7.31%. The calculated values are 112, 64.29%, and 7.15%, respectively.

Any solvent which dissolves and is inert toward acyl halides, tertiary amines, and ethenones is operable. Thus a wide variety of solvents, including ethers, aromatic or aliphatic hydrocarbons, aromatic or aliphatic chlorinated hydrocarbons containing inactive halogen atoms, such as trichlorethylene or carbon tetrachloride, are suitable. Chlorinated hydrocarbons not suitable as solvents include benzyl chloride and alpha- or beta-chloroethers. In those cases where the substituted ethenones are isolated by distillation, it is most convenient to choose a solvent boiling either considerably below or above the substituted ethenone, thereby facilitating the separation of the product from the solvent. Such a choice is especially beneficial in preparing and isolating the lower substituted ethenones when distillation is used in the separation. Specific suitable solvents include ligroin, benzene, toluene, xylene, chlorobenzene, dichlorobenzene, diethyl ether, dibutyl ether, chloroform, carbon tetrachloride, and trichloroethylene.

The amount of solvent may be varied within wide limits. Using 100–200 parts solvent per tenth mol of each reactant has been found satisfactory. The amount of solvent used should be sufficient to dissolve the substituted ethenone, thus facilitating the separation of the insoluble tertiary amine hydrochloride by filtration. It is also feasible to use an excess of the tertiary aliphatic amine as solvent in cases where the substituted ethenone can be readily separated from the amine and its hydrochloride. The dehydrohalogenation can be carried out in the absence of a solvent when the presence of the amine hydrochloride in the product is not objectionable in the use to which the latter is to be put.

A wide temperature range for the reaction is also permissible. The process may be carried out successfully at temperatures ranging from 0° C. to 140° C., and in many instances temperatures above and below this range may be used. The process is ordinarily carried out at atmospheric pressure (i. e., about 760 mm.), but operation at pressures above or below atmospheric is feasible.

As already indicated, the invention is generically applicable to primary acid halides

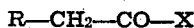

wherein X is any halogen and R is a monovalent organic radical which is chemically inert at temperatures up to 170° C. towards tertiary amines, acyl halides and ethenones. Alternatively, the acid halide may be designated as a primary monoacyl halide of at least three carbon atoms and free of reactive groups other than the one acid halide group. The symbol X in the formula just given is preferably chlorine, but may be fluorine, bromine, or iodine. R is preferably a hydrocarbon radical such as aryl, aralkyl, cycloalkyl, and open chain aliphatic hydrocarbon (especially alkyl), but may contain inert radicals such as carbalkoxy, alkoxy, aryloxy, aralkoxy, halogen attached to aromatic carbon, ketonic carbonyl, tertiary amide (i. e. having no amido hydrogen), or aliphatic heterocyclic radicals. By the latter is meant radicals not having benzene-type unsaturation, which is commonly represented by three alternating double bonds in a ring structure. The heterocyclic radical may thus be saturated or unsaturated. Types of radicals which should not be present are aromatic heterocyclic radicals, amide groups containing amido hydrogen, and acyloxy groups. Specific acid halides that are suitable include the following: n-octadecanoyl, 9,10-octadecenoyl (oleyl), linoleyl, n-hexadecanoyl, n-tetradecanoyl, n-dodecanoyl, n-decanoyl, n-nonanoyl, n-octanoyl, n-hexanoyl, n-heptanoyl, 3-methylbutanoyl, n-butanoyl, n-propanoyl, delta-carbomethoxypentanoyl, 4-(N-dimethylamino)-butanoyl, 4-phenoxybutanoyl, 5-(2,3,5-trichlorophenoxy)pentanoyl, 5-keto-octanoyl, and 10-furyldecanoyl chlorides, and also the corresponding bromides, iodides and fluorides.

The invention is generic to the use of tertiary saturated mono- or poly-amines free from active hydrogen (hydrogen bonded to an inorganic element, e. g., O, S, Se, Te, N, P, As), in which all the radicals attached to the amino nitrogen or nitrogens are aliphatic in character, or, more simply, saturated tertiary aliphatic amines free of active hydrogen. This particular terminology is used to embrace, among others, tertiary amines (1) in which the three amino nitrogen valences are each satisfied by a saturated open chain alkyl radical; (2) those in which one or more of the nitrogen valences are satisfied by saturated monovalent cycloalkyl radicals, and (3) those in which one of the valences is satisfied by a saturated open chain or cycloalkyl radical and two valences are satisfied by a single bivalent radical, as in the piperidine and morpholine rings. Where the tertiary amine is a polyamine the nitrogens must be separated by a chain of at least two carbon atoms. Saturated tertiary acyclic amines free of active hydrogen are preferred. Specific suitable amines include trimethylamine, triethylamine, tri-n-propylamine, methyldiethylamine, ethylmethylpropylamine, benzyl-N,N-dimethylamine, 1-ethylpiperidine, 1-isopropylpiperidine, 1-methyl-hexahydroazepine, 1-methylpyrrolidine, N,N,N',N'-tetramethylethylenediamine, N-methylmorpholine, N-methylthiomorpholine, cyclohexyl-N,N-diethylamine, ethyl-N,N-dicyclohexylamine, N,N,N',N'-tetramethylhexamethylenediamine, 1,3-di(1-piperidyl)propane and 1,4-bis(diethylamino)butane. Tertiary amines which have been found not to dehydrohalogenate acid halides of the above type under conditions disclosed herein are pyridine, dimethylaniline, bis(dimethylamino)methane, and dipiperidinomethane.

For complete reaction, equivalent quantities of amine and acyl halides are desirable. An excess of one of the reactants is not harmful but may introduce some difficulty in isolating the product.

A most important condition of the process is that both the reaction and the isolation of the product take place under anhydrous conditions. If these conditions are not fulfilled, the reaction may take quite a different course.

On the basis of the reactions they undergo, the substituted ethenones have been assigned the formula $$R-CH_2-CO-C(R)=C=O$$

where R is the residue R of the acid halide $RCH_2-COX$ and, as previously indicated, is an organic radical which is unaffected at temperatures up to 170° C. by tertiary amines, acid halides, and ethenones. Evidence for the beta-ketonic structure lies in the fact that the products on hydration are converted to acids which on heating lose carbon dioxide with formation of a ketone, a reaction which is characteristic of beta-ketoacids.

Two mechanisms which may account for the production of substituted ethenones by the reaction of a primary acid chloride and a tertiary amine are given in the following series of equations:

(1)    $2RCH_2COCl + 2R'_3N \rightarrow$
           $2(R-CH=C=O) + 2R'_3N.HCl$
     $2R-CH=C=O \rightarrow RCH_2COC(R)=C=O$ or (2)    $RCH_2COCl + R'_3N \rightarrow RCH=C=O + R'_3N.HCl$
     $RCH=C=O + RCH_2COCl \rightarrow$
                   $RCH_2COCHRCOCl$
     $RCH_2COCHRCOCl + R'_3N \rightarrow$
           $RCH_2COC(R)=C=O + R'_3N.HCl$ The exact course of this reaction cannot be defined on the basis of known facts. In view of this, the products are best defined as intermolecular dehydrohalogenation products of primary acyl halides of the probable formula given above, which products melt below 100° C.

The substituted ethenones of the present invention may be used in the preparation of symmetrical ketones, substituted beta-keto amides, anilides, and esters. Many of these derivatives are useful as dye intermediates. The substituted ethenones derived from acyl halides of at least seven carbon atoms are particularly useful in that they have the ability to impart a desirable waterproofing effect to organic fibrous materials. This is more fully described in copending application Serial Number 234,842 filed October 13, 1938, by W. E. Hanford. The higher the carbon content of the acid halide, the better the waterproofing. Thus the products from octanoyl, dodecanoyl, and octadecanoyl chlorides gave noticeable, substantial, and excellent water-proofing effects, respectively. The dehydrohalogenation products from acyl halides having up to about 6 carbon atoms, however, may also be applied to organic fibrous materials, and, while in general no exceptional water-proofing is observed, there is obtained favorable alteration of dyeing characteristics. The products from acyl halides of comparatively higher carbon content, i. e., those having about twelve or more carbons, impart both softening and water-repellent effects to fabrics. A further use for the products of the present invention is in the treatment of cellulose acetate, to which the products from propanoyl and octanoyl chlorides, in particular, impart a a greater water resistance.

This invention provides a simple, economical and convenient method of making new and hitherto unavailable products. Those derived from acid halides of eight or more carbons are especially important in that they have a wider utility, are generally obtained in better yields, are more readily crystallized, and are on the whole more stable in being less sensitive to moisture and capable of preservation for long periods. In the latter respect all the products of the present invention are markedly different from the known aldoethenone, acetylethenone, in that the latter polymerizes and darkens rapidly.

According to the prior art dehydroacetic acid is the only product obtained by the dehydrohalogenation of acetyl chloride with triethylamine in an inert solvent or pyridine in a sealed tube. It was therefore unexpected and surprising that compounds analogous to dehydroacetic acid were not formed in the dehydrohalogenation of the higher primary acyl halides. The isolation of substituted ethenones of the type $$RCH_2COC(R)=C=O$$

was also unexpected since the literature teaches that pyranones are the reaction products when primary acid chlorides (except acetyl chloride) are dehydrohalogenated. These pyranones are not water-sensitive. The products of the present invention must be prepared, isolated and handled under anhydrous conditions.

The above description and examples are intended to be illustrative only. Any modification of or variation therefrom which conforms to the spirit of the invention is intended to be included within the scope of the claims.

I claim:

1. Octadecanoylhexadecylethenone.
2. A process which comprises reacting octadecanoyl chloride with triethylamine in an anhydrous solvent, and thereafter separating from the reaction products the so-formed octadecanoylhexadecylethenone, the entire process being conducted under anhydrous conditions.

JOHN CARL SAUER.